United States Patent
Kim et al.

(10) Patent No.: US 12,311,807 B2
(45) Date of Patent: May 27, 2025

(54) SEAT AUTOMATIC ARRANGEMENT METHOD AND APPARATUS OF AUTONOMOUS DRIVING VEHICLE

(71) Applicants: Hyundai Motor Company, Seoul (KR); Kia Corporation, Seoul (KR); Unick Corporation, Gyeongsangnam-do (KR); Hyundai Transys Inc., Seosan-Si (KR)

(72) Inventors: Eun Sue Kim, Gyeonggi-do (KR); Dae Hee Lee, Incheon (KR); Dong Woo Jeong, Gyeonggi-do (KR); Myung Hoe Kim, Seoul (KR); Duk Kyu Byun, Gyeonggi-do (KR); Jin Wook Choi, Gyeonggi-do (KR); Gwon Young Jang, Gyeonggi-do (KR); Sin Jeong Kang, Gyeonggi-do (KR); Byoung Wan Bae, Gyeonggi-do (KR); Min Kyu Lee, Gyeonggi-do (KR); Chang Hoon Lee, Busan (KR); Ho Hun Hwang, Busan (KR)

(73) Assignees: Hyundai Motor Company, Seoul (KR); Kia Corporation, Seoul (KR); Unick Corporation, Gyeongsangnam-do (KR); Hyundai Transys Inc., Chungcheongnam-do (KR)

( * ) Notice: Subject to any disclaimer, the term of this patent is extended or adjusted under 35 U.S.C. 154(b) by 204 days.

(21) Appl. No.: 17/897,812

(22) Filed: Aug. 29, 2022

(65) Prior Publication Data

US 2023/0150400 A1    May 18, 2023

(30) Foreign Application Priority Data

Nov. 15, 2021    (KR) .......................... 10-2021-0156740

(51) Int. Cl.
  *B60N 2/14*    (2006.01)
  *B60N 2/01*    (2006.01)
  (Continued)

(52) U.S. Cl.
  CPC ............... *B60N 2/143* (2013.01); *B60N 2/01* (2013.01); *B60N 2/0228* (2013.01);
  (Continued)

(58) Field of Classification Search
  CPC ........ B60N 2/143; B60N 2/01; B60N 2/0244; B60N 2/10; B60N 2/14; B60N 2/0237;
  (Continued)

(56) References Cited

U.S. PATENT DOCUMENTS 9,096,150 B2    8/2015    Cuddihy et al.
9,340,126 B2    5/2016    Cuddihy et al.
(Continued)

FOREIGN PATENT DOCUMENTS

CN    108944701 A  *  12/2018  ............. B60K 35/00
CN    109204073 A  *   1/2019  ............... B60N 2/01
(Continued)

OTHER PUBLICATIONS

CN 108944701 A original and translation (Year: 2018).*
(Continued)

*Primary Examiner* — Frederick M Brushaber
(74) *Attorney, Agent, or Firm* — Fox Rothschild LLP (57) ABSTRACT

A seat automatic arrangement method and apparatus of an autonomous driving vehicle is provided. The seat automatic arrangement method and apparatus have an advantage that it is possible to automatically arrange seats in the vehicle into the seat-facing mode through remote control, and it is possible to prevent interference when moving the seats by arranging the seats in accordance with priority when arranging the seats into the seat-facing mode, thereby being able to (Continued)

more smoothly arrange the seats into the seat-facing mode in an autonomous driving vehicle.

7 Claims, 3 Drawing Sheets

(51) Int. Cl.
  *B60N 2/02* (2006.01)
  *B60N 2/10* (2006.01)
(52) U.S. Cl.
  CPC .............. *B60N 2/0233* (2023.08); *B60N 2/10* (2013.01); *B60N 2/14* (2013.01); *B60N 2/0237* (2023.08); *B60N 2/0273* (2023.08); *B60N 2210/14* (2023.08); *B60N 2220/10* (2023.08); *B60N 2220/20* (2023.08)
(58) Field of Classification Search
  CPC B60N 2/0273; B60N 2220/20; B60N 2/0228; B60N 2/0233; B60N 2002/0055; B60N 2210/14; B60N 2220/10; B60N 2/06; B60N 2/22; B60N 2/005
  See application file for complete search history.

(56) References Cited

U.S. PATENT DOCUMENTS

| | | | |
|---|---|---|---|
| 9,815,388 B1* | 11/2017 | Lindsay | B60N 2/0248 |
| 10,166,996 B2* | 1/2019 | Ishihara | B60W 10/04 |
| 10,675,994 B2 | 6/2020 | Fitzpatrick et al. | |
| 10,800,291 B2* | 10/2020 | Parida | B60N 2/0273 |
| 10,814,746 B2 | 10/2020 | Sailer et al. | |
| 11,021,082 B2* | 6/2021 | Ahn | B60N 2/91 |
| 11,673,520 B2* | 6/2023 | Li | B60N 2/0279 |
| | | | 701/36 |
| 2009/0322137 A1* | 12/2009 | Kojima | B60N 2/2356 |
| | | | 297/362 |
| 2015/0251566 A1* | 9/2015 | Cuddihy | B60N 2/01 |
| | | | 296/65.09 |
| 2016/0152163 A1* | 6/2016 | Strasdat | B60N 2/24 |
| | | | 296/64 |
| 2017/0246969 A1* | 8/2017 | Falchero | B60N 2/20 |
| 2018/0194194 A1* | 7/2018 | Lyubich | B60H 1/00285 |
| 2021/0309247 A1* | 10/2021 | Kim | B60N 2/06 |
| 2022/0388465 A1* | 12/2022 | Roberts | G01S 7/415 |
| 2023/0311716 A1* | 10/2023 | Herrmann | B60N 2/02246 |
| | | | 296/65.12 |

FOREIGN PATENT DOCUMENTS

| | | | | |
|---|---|---|---|---|
| CN | 110053562 A | * | 7/2019 | ............... B60N 2/01 |
| CN | 111231778 A | * | 6/2020 | ........... B60N 2/0232 |
| DE | 19742408 A1 | * | 4/1998 | ............... B60N 2/06 |
| JP | 2020-055432 A | | 4/2020 | |
| JP | 2020-117029 A | | 8/2020 | |
| KR | 10-2019-0031699 A | | 3/2019 | |
| KR | 10-2020-0071784 A | | 6/2020 | |
| KR | 10-2149234 B1 | | 8/2020 | |

OTHER PUBLICATIONS

CN 109204073 A original and translation (Year: 2019).*
CN 11053562 A original and translation (Year: 2019).*
CN 111231779 A original and translation (Year: 2019).*
DE 19742408 A1 original and translation (Year: 1997).*

* cited by examiner

SEAT AUTOMATIC ARRANGEMENT METHOD AND APPARATUS OF AUTONOMOUS DRIVING VEHICLE

CROSS REFERENCE TO RELATED APPLICATION

The present application is based on and claims under 35 U.S.C. § 119(a) the benefit of Korean Patent Application No. 10-2021-0156740, filed Nov. 15, 2021, the entire contents of which is incorporated herein for all purposes by this reference.

TECHNICAL FIELD

Embodiments of the present disclosure relate to a seat automatic arrangement method and apparatus of an autonomous driving vehicle and, more particularly, a seat automatic arrangement method and apparatus of an autonomous driving vehicle, the method and apparatus being able to automatically arrange seats of a vehicle in a seat-facing mode from a standard mode through remote control.

BACKGROUND

An autonomous driving vehicle, which is a smart vehicle employing an autonomous technology enabling the vehicle to go a destination by itself even though a driver does not operate the steering wheel, acceleration pedal, brake, etc., is recently being rapidly developed.

If autonomous driving is generally used, a driver can select a manual driving mode in which the driver manually drives and an autonomous driving mode in which a vehicle goes by itself to a destination without the driver manually driving.

In the autonomous driving mode, various modes can be implemented, depending on the arrangement state of seats such as an individual mode in which passengers in the seats individually take a rest in a comfortable posture and a seat-facing mode (including a facing mode, a face-to-face mode, a conversation mode) in which the passengers in the first row seats and the second row seats face each other. It is required to be able to remotely adjust the positions, postures, etc. of seats in order to implements various seat modes.

Meanwhile, there is a defect that if there is no priority in the arrangement processes when seats are remotely adjusted to be moved and arranged in the seat-facing mode, interference with surrounding parts is generated when the seats are moved, and accordingly, arrangement of the seats is not performed well.

The description provided above as a related art of the present disclosure is just for helping to understand the background of the present disclosure and should not be construed as being included in the related art known by those skilled in the art.

SUMMARY

The present disclosure is related to a seat automatic arrangement method and apparatus of an autonomous driving vehicle, the method and apparatus automatically arranging seats of a vehicle in a seat-facing mode from a standard mode through remote control and arranging seats in accordance with priority in the arrangement process to prevent interference when the seats are moved, thereby smoothly arranging the seats.

In one aspect, a method is provided that is particularly suitable for use with an autonomous driving vehicle that comprise d, which arranges positions and/or postures of seats comprising first and second row seats, the suitably method comprising: a) generating a signal corresponding to a seat-facing mode of seats when an operation device is operated; b) changing positions and/or postures of a console, first row seats, and/or second row seats wherein interference does not occur when the signal corresponding to the seat-facing mode is generated; c) rotating the first row seats such that the first row seats face the second row seats after step b); and d) returning the positions and/or postures of the console, the first row seats, and the second row seats to reference positions or positions designated by a user after step c), and wherein changing the seats of the vehicle into the seat-facing mode is finished after completion of step d).

In certain aspects, when the console or a seat is inhibited e.g. stuck due to interference with surrounding parts while steps b), c) and/or d) are performed, an error signal is transmitted to the operation device so that a passenger can visually and/or aurally recognize the error signal.

In additional aspects, particular, the present disclosure is related to a seat automatic arrangement method of an autonomous driving vehicle, which arranges positions and postures of seats including first row seats and second row seats through remote control, includes: a signal generation step of generating a signal corresponding to a seat-facing mode of seats when an operation device is operated; a moving step of changing positions and postures of a console, first row seats, and second row seats to safety regions wherein interference does not occur when the signal corresponding to the seat-facing mode is generated; a rotating step of rotating the first row seats such that the first row seats face the second row seats after the moving step; and a returning step of returning the positions and postures of the console, the first row seats, and the second row seats to reference positions or positions designated by a user after the rotating step, in which changing the seats of the vehicle into the seat-facing mode is finished after the returning step is finished.

In some embodiments of the above methods, as discussed, when the console or a seat is stuck or inhibited e.g. due to interference with surrounding parts while the moving step, the rotating step, and the returning step are performed, an error signal may be transmitted to the operation device so that a passenger can visually and/or aurally recognize the error signal.

In some embodiments, a position and a posture of a stuck or inhibited console or seat may be returned to a previous step.

In some embodiments, when the vehicle is turned off after the seats finish being changed to the seat-facing mode, the console and the seats may be automatically changed to a standard mode.

In some embodiments, the standard mode of the seats may be a mode of a state in which the first row seats including a driver seat and a passenger seat, and the second row seats positioned behind the first row seats all face a front; and the seat-facing mode may be a mode in which the first row seats and the second row seats face each other.

In some embodiments, an operation when the seats are changed to the seat-facing mode may include an operation of moving forward and rearward the seats, an operation of rotating the seats, and an operation of reclining the seats.

In some embodiments, the console may include a front console and a rear console that are separated from each other, and the front console may be moved forward, and the rear console may be moved rearward in the moving step.

In some embodiments, the front console and the rear console may be moved forward and rearward, respectively, to a position where interference with the first row seats does not occur when the first row seats are rotated in the rotating step.

In some embodiments, the first row seats may include a driver seat and a passenger seat; and any one of the driver seat and the passenger seat may be rotated first and then the other one may be rotated when the seat rotating first is rotated over 50%, when the first row seats are rotated in the rotating step.

In some embodiments, a seat automatic arrangement apparatus of an autonomous driving vehicle according to the present disclosure includes: an operation device configured to be operated by a passenger in the vehicle to generate a signal corresponding to a seat-facing mode of seats; a console motor provided at a console to adjust a position of the console; a console controller configured to control operation of the console motor; a seat motor provided at each of the seats to adjust a position and a posture of a corresponding seat; a seat controller configured to control operation of the seat motor; and a vehicle controller configured to transmit a signal from the operation device to the console controller and the seat controllers and to transmit an error signal due to sticking of the console or the seats to the operation device.

In some embodiments, the operation device may include a display device in the vehicle which is operated in a touch type by a passenger and a mobile phone of a passenger.

In some embodiments, the seats may include first row seats including a driver seat and a passenger seat, and second row seats positioned behind the first row seats; and the console may include a front console and a rear console that are positioned between the driver seat and the passenger seat and are separated from each other.

In some embodiments, the console motor may include a front console motor and a rear console motor provided at the front console and the rear console, respectively; the front console and the rear console may be individually moved forward and rearward by power from the front console motor and the rear console motor; and operation of the front console motor and the rear console motor may be controlled by the console controller.

In some embodiments, the seat motor may include a swivel motor configured to rotate a seat, a moving motor configured to move a seat forward and rearward, and/or a reclining motor configured to rotate a seatback.

In some embodiments, the seat motor may further comprise a height motor configured to adjust height of a seat.

In some embodiments, the vehicle controller may be further configured to receive the position of the console.

In some embodiments, the vehicle controller may be further configured to receive the position of the console.

In some embodiments, the vehicle controller may be further configured to determine whether the position of the console interferes with the seats when the seats are moved for the seat-facing mode.

According to the seat automatic arrangement method and apparatus of an autonomous driving vehicle of the present disclosure, there is an effect that it is possible to automatically arrange seats in the vehicle into the seat-facing mode through remote control, and it is possible to prevent interference when moving the seats by arranging the seats in accordance with priority when arranging the seats into the seat-facing mode, thereby being able to more smoothly arrange the seats into the seat-facing mode in an autonomous driving vehicle.

As discussed, the method and system suitably include use of a controller or processor.

In another embodiment, vehicles are provided that comprise a seat automatic arrangement apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A controller (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A seat automatic arrangement method and apparatus of an autonomous driving vehicle according to exemplary embodiments of the present disclosure is described hereafter in detail with reference to the accompanying drawings.

Figure 1:
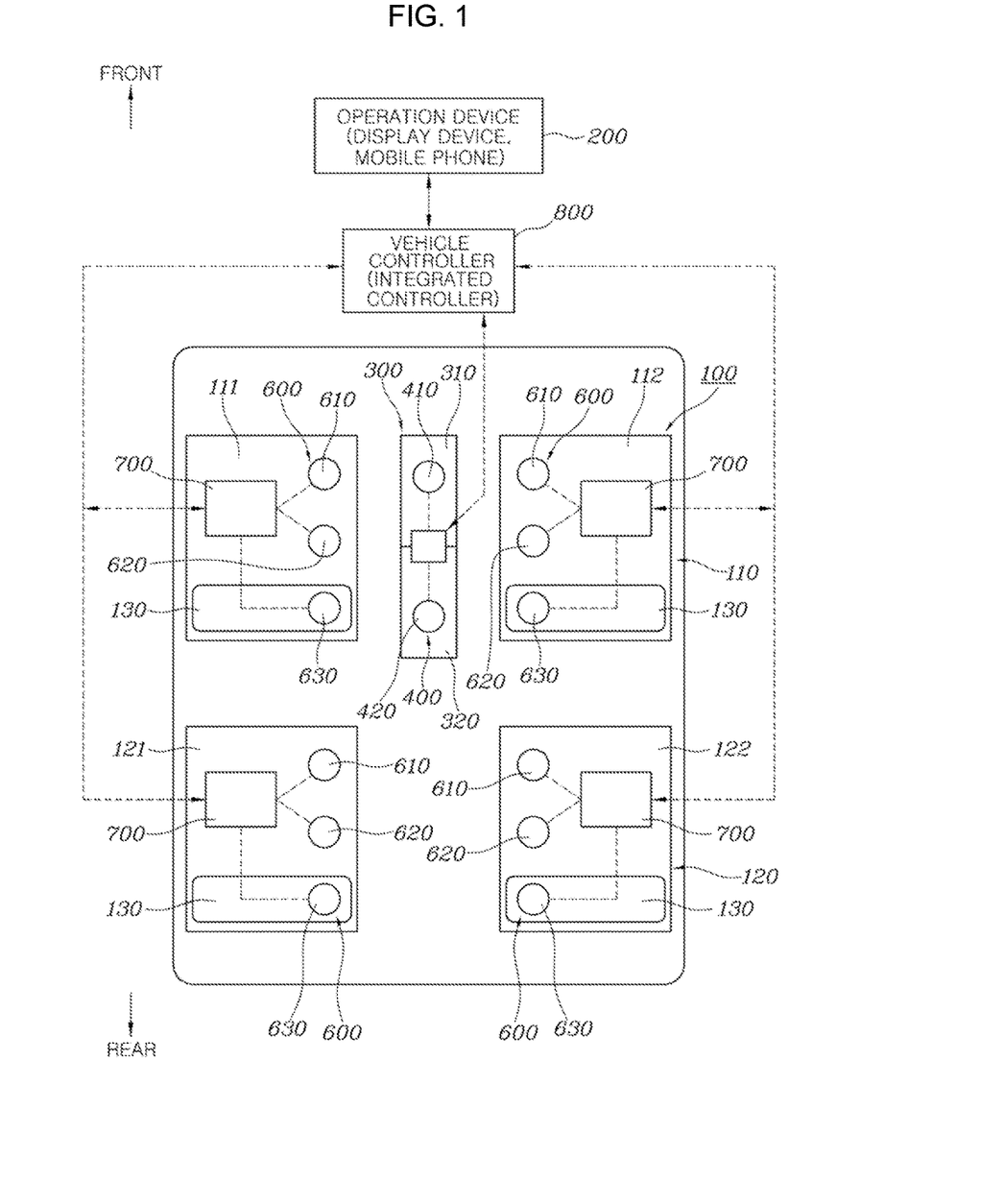
FIG. 1 is a schematic view showing the configuration of a seat automatic arrangement apparatus of an autonomous driving vehicle according to the present disclosure.

A seat automatic arrangement apparatus of an autonomous driving vehicle according to the present disclosure, as shown in FIG. 1, may include: an operation device 200 that is operated by a passenger in a vehicle to generate a signal corresponding to a seat-facing mode of seats 100; a console motor 400 that is provided at a console 300 to adjust the position of the console 300; a console controller 500 that controls operation of the console motor 400; a seat motor 600 that is provided at each of the seats 100 to adjust the position and the posture of the corresponding seat 100; a seat controller 700 that controls operation of the seat motor 600; and a vehicle controller (an integrated controller) 800 that transmits a signal from the operation device 200 to the console controller 500 and the seat controllers 700 and transmits an error signal due to sticking of the console 300 or the seats 100 to the operation device 200.

The seats 100 in the autonomous driving vehicle may include first row seats 110 including a driver seat 111 and a passenger seat 112, and second row seats 120 positioned behind the first row seats 110.

The second row seats 120 may include a left seat 121 positioned behind the driver seat 111 and a right seat 122 positioned behind the passenger seat.

Third row seats may be provided, depending on the kind of vehicle.

The first row seats 110 and the second row seats 120 may be configured to be able to be individually moved by the seat motors 600 that are controlled and driven by the seat controllers 700.

Movement of the seat 100 may include rotation of the seat 100, forward and rearward movement of the seat 100, reclining of a seatback 130, and if necessary, may include height adjustment operation of the seat 100.

The operation device 200 includes a display device (AVN) of the vehicle that is operated in a touch type by a passenger, and a mobile phone of a passenger.

The seat motor 600 may be provided for each seat 100. The seat motor 600 includes a swivel motor 610 that rotates the seat 100, a moving motor 620 that moves the seat 100 forward and backward, and a reclining motor 630 that rotates the seatback 130 forward and backward, and if necessary, may include a height motor that adjusts the height of the seat 100.

The swivel motor 610, the moving motor 620, the reclining motor 630, and the height motor each may have a sensor and are configured to be individually controlled and operated by the seat controller 700 using the sensors.

The seats 100 may be configured to be able to move forward and rearward on seat rails, or, if necessary, may be configured to be able to move without a seat rail, and in this case, the seats 100 can be moved using 2D or 3D coordinates.

The console 300 having a console motor 400 may be installed between the driver seat 111 and the passenger seat 112.

The console 300 may include a front console 310 and a rear console 320 that are separated from each other, and the console motor 410 includes a front console motor 410 and a rear console motor 420 provided at the front console 310 and the rear console 320, respectively.

The front console 310 and the rear console 320 may be configured to individually move forward and rearward by power from the front console motor 410 and the rear console motor 420. The front console motor 410 and the rear console motor 420 each have a sensor and the operation thereof is controlled by the console controller 500 using the sensors.

The front console 310 and the rear console 320 may be configured to be able to move forward and rearward on console rails, or, if necessary, may be configured to be able to move without a console rail, and in this case, the front console 310 and the rear console 320 can be moved using 2D or 3D coordinates.

Surrounding parts that may interfere with the seats 100 and the console 300 that are being moved may be a dashboard, doors, etc.

The seats 100 may be configured to be able to move forward and rearward, and if necessary, may be configured to be able to move left and right and diagonally.

Seat rails may be configured to move the seats 100, and may be configured to be able to move to desired positions even without a seat rail if autonomous driving is popularized.

It is apparent that the console 300 may also be configured to have the same movement as the seats 100.

Figure 2:
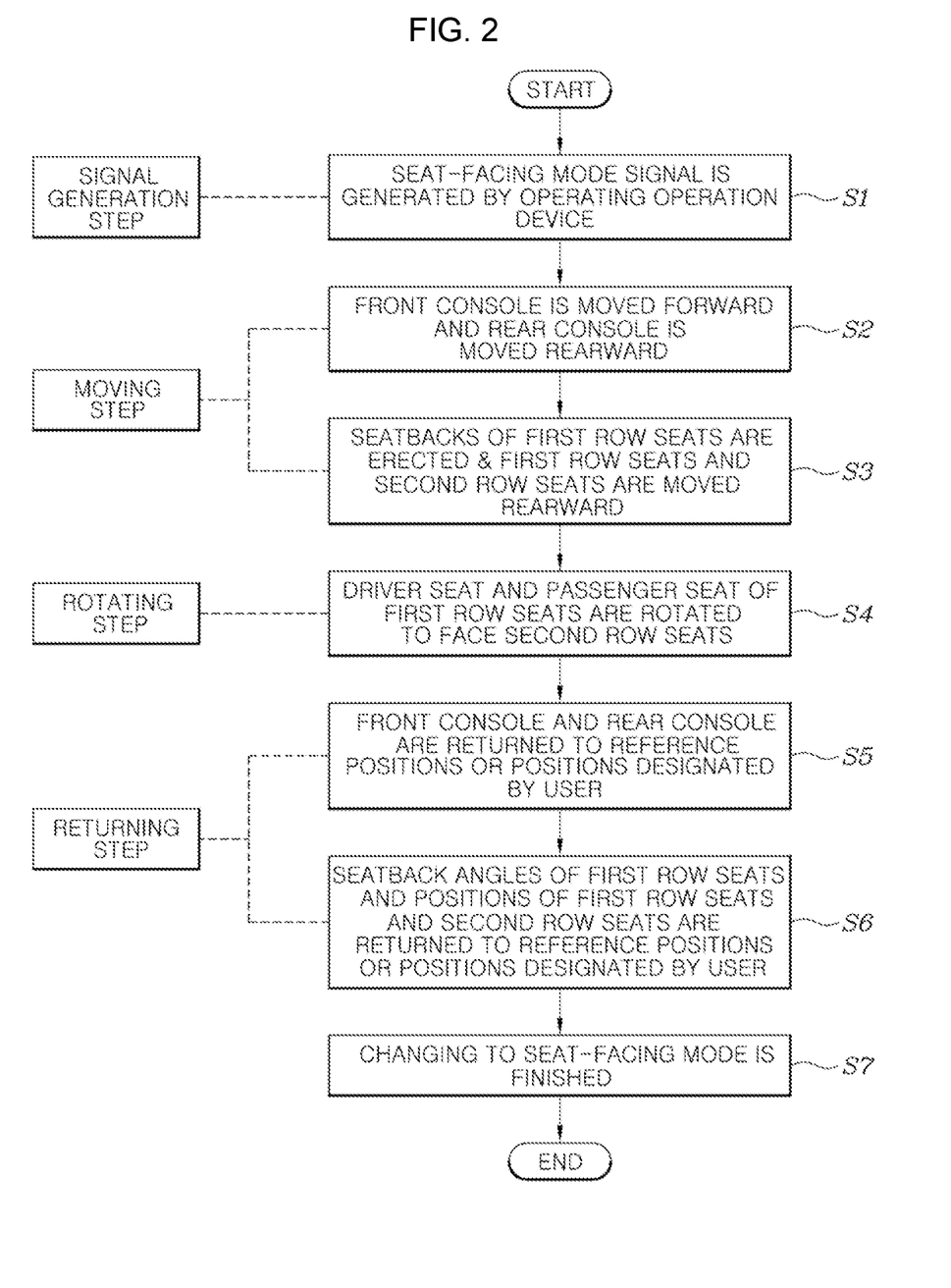
FIG. 2 is a schematic flowchart showing the configuration of a seat automatic arrangement method of an autonomous driving vehicle according to the present disclosure.

A seat automatic arrangement method of an autonomous driving vehicle according to the present disclosure is described hereafter with reference to FIGS. 1 to 3.

The method may include a signal generation step in which a user operates the operation device 200 and a signal corresponding to seat-facing mode is generated; a moving step of changing the positions and postures of the console 300, the first row seats 110, and the second row seats 120 to safety regions where interference does not occur when the signal corresponding to the seat-facing mode is generated; a rotating step of rotating the first row seats 110 such that the first row seats 110 face the second row seats 120 after the moving step; and a returning step of returning the positions and postures of the console 300, the first row seats 110, and the second row seats 120 to reference positions or positions designated by a user after the rotating step. After the returning step is finished, changing the seats 100 of the vehicle into the seat-facing mode that is the final target is finished.

When the vehicle is turned on and a signal corresponding to the seat-facing mode is generated by a passenger operating the operation device 200 (step S1), the seats 100 of the vehicle may be finally changed from the standard mode, which is the current arrangement state, to the seat-facing mode that the passenger wants.

The standard mode of the seats 100 may be defined as a mode of the state in which the first row seats 110 including the driver seat 111 and the passenger seat 112 and the second row seats 120 positioned behind the first row seats 110 all face the front.

Figure 3:
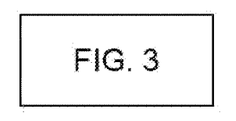
FIGS. 3A to 3G are views showing an embodiment of a process of changing seats from a standard mode to a seat-facing mode in accordance with the present disclosure.
Figure 3A:
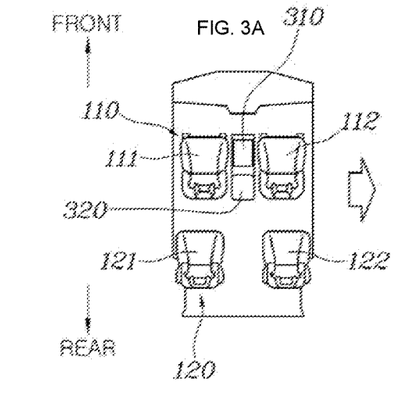
Figure 3B:
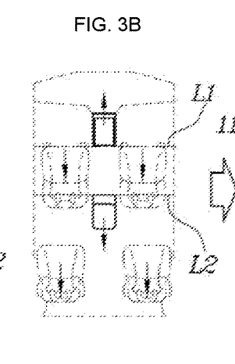
Figure 3C:
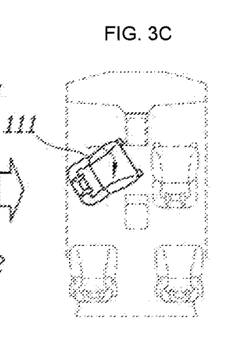
Figure 3D:
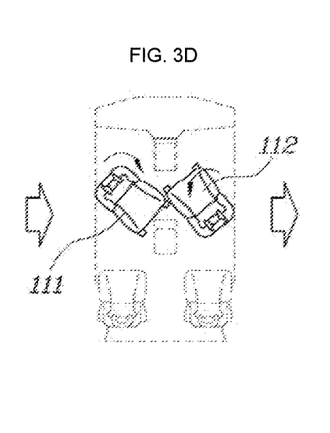
Figure 3E:
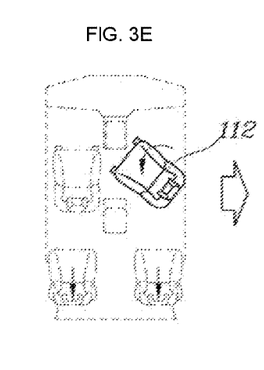
Figures 3F, 3G:
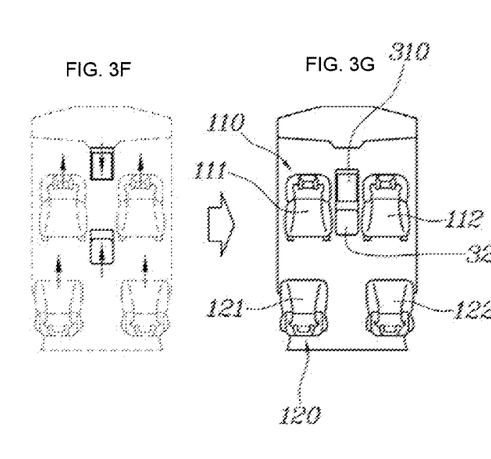

The seat-facing mode (a facing mode, a face-to-face mode, a conversation mode) may be defined as a mode in which the first row seats 110 and the second row seats 120 face each other, as shown in FIG. 3G.

When the operation device 200 is operated and a signal for the seat-facing mode is generated (step S1) in the standard mode shown in FIG. 3A, the front console motor 410 and the rear console motor 420 may be controlled to operate by the console controller 500 in the moving step, as shown in FIG. 3B, whereby the front console 310 and the rear console 320 slide to safety regions by moving forward and rearward, respectively (step S2).

The safety regions may be positions where interference with the first row seats 110 does not occur when the first row seats 110 are rotated in the rotating step shown in FIGS. 3C to 3E. The front console 310 is moved forward to a front reference line L1 and the rear console 320 is moved rearward to a rear reference line L2.

When the front console 310 is moved forward and the rear console 320 is moved rearward, in the moving step shown in FIG. 3B, the seat motors 600 may be controlled to operate by the seat controllers 700, whereby the seatbacks 130 of the first row seats 110 are erected, and the first row-seats 110 and second row seats 120 all slide rearward and enter the safety regions (step S3).

The angle of the seatbacks 130 may be adjusted by the reclining motors 630, and the first row seats 110 and the second row seats 120 are moved rearward by the moving motors 620.

Erecting the seatbacks 130 of the first row seats 110 and moving rearward the first row seats 110 and the second row seats 120 may be for preventing the first row seats 110 from being interfered with when the first row seats 110 are rotated in the rotating step shown in FIGS. 3C to 3E.

After the moving step is performed, the rotating step of rotating the first row seats 110 may be performed.

That is, after the first row seats 110 and the second row seats 120 are moved rearward through step S3, the driver seat 111 and the passenger seat 112 of the first row seats 110 may be rotated rearward to face the second row seats 120 (step S4).

When the first row seats 110 are rotated, the driver seat 111 starts to be rotated first by the swivel motor 510, as shown in FIG. 3D, the passenger seat 112 may start to be rotated when the driver seat 111 is rotated over 50%, as shown in FIG. 3D, and then the driver seat 111 may finish being rotated first and then sequentially the passenger seat 112 may finish being rotated, as shown in FIG. 3E.

The reason of rotating the driver seat 111 and the passenger seat 112 with a predetermined time difference may be for preventing interference therebetween.

After the rotating step is performed, the returning step in which the front console 310 and the rear console 320 may be returned to the reference positions or positions designated by a user and the angle of the seatbacks 130 of the first row seats 110 and the positions of the first row seats 110 and the second row seats 120 are returned to the reference positions or positions designated by a user is performed.

That is, after the first row seats 110 finish being rotated rearward through step S4, the front console 310 that has been moved forward and the rear console 320 that has been moved rearward are moved rearward and forward, respectively, as shown in FIG. 3F, and returned to the reference positions or the positions designated by a user shown in FIG. 3A by the front console motor 410 and the rear console motor 420 (step S5).

Further, in the returning step shown in FIG. 3F, the seat motors 600 may be controlled to operate by the seat controllers 700, the seatbacks 130 of the first row seats 110 may be returned to the reference positions or the positions designated by a user shown in FIG. 3A, and the first row seats 110 and the second row seats 120 may be all moved forward and returned to the reference positions or the positions designated by a user shown in FIG. 3A (step S6).

The angle of the seatbacks 130 may be adjusted by the reclining motors 630, and the first row seats 110 and the second row seats 120 are returned by the moving motors 620.

After the front console 310, the rear console 320, the first row seats 110, and the second row seats 120 are returned, the process of changing the seats 100 of the vehicle into the seat-facing mode in which the first row seats 110 and the second row seats 120 face each other, as shown in FIG. 3G, may be finished (step S7).

Meanwhile, when the seats 100 and the console 300 in the vehicle are changed into the seat-facing mode, the vehicle controller 800 may determine whether the seats 100 and the console 300 are stuck due to interference with the surrounding parts.

The seat controllers 700 may detect the current positions and postures of the seats 100 using Hall sensors of the swivel motor 610, the moving motor 620, and the reclining motor 630 of the seat motor 600 and transmit the current positions and postures to the vehicle controller 800. The vehicle controller 800 determines whether the seats 100 are interfered with by the surrounding parts while moving for the seat-facing mode with reference to the information about the seats 100 transmitted from the seat controllers 700 and the paths for moving for the seat-facing mode.

The vehicle controller 800 may receive the position of the console 300, which is a surrounding part around the seats 100, though a Hall sensor at the console motor 400, and determines also whether the current position of the console 300 interferes with the seats 100 when the seats 100 are moved for the seat-facing mode.

When the seats 100 and the console 300 are stuck due to the surrounding parts (a dashboard, doors, etc.) when they are changed to the seat-facing mode, an error signal may be transmitted to the operation device 200 by control of the seat controllers 700, the console controller 500, and the vehicle controller 800, so a passenger can visually and aurally recognize the error signal.

That is, when a seat 100 is stuck while moving, load may be generated in the corresponding motor and an error signal of the motor is transmitted to the operation device 200 that is configured to be operated by a passenger, and the passenger visually or aurally recognizes the error signal transmitted to the operation device 200 and stops the operation, whereby damage and breakage of parts can be prevented.

Further, according to an embodiment of the present disclosure, the seats 100 or the console 300 that is stuck in the process of entering the seat-facing mode may be returned to the position and posture in the previous step or is stopped so that damage and breakage of parts such as the motor can be prevented.

Further, according to an embodiment of the present disclosure, when the vehicle is turned off after the seats 100 are changed to the seat-facing mode, the seats 100 and the console 300 may be automatically changed to the standard mode, thereby preparing for the next operation.

The seat automatic arrangement method and apparatus of an autonomous driving vehicle according to the present disclosure, as described above, have an advantage that it is possible to automatically arrange the seats 100 in the vehicle into the seat-facing mode through remote control, and particularly, it is possible to prevent interference when moving the seats 100 by arranging the seats 100 in accordance with priority when arranging the seats 100 into the seat-facing mode, thereby being able to more smoothly arrange the seats 100 into the seat-facing mode in an autonomous driving vehicle.

Although the present disclosure was described with reference to specific embodiments shown in the drawings, it is apparent to those skilled in the art that the present disclosure may be changed and modified in various ways without departing from the scope of the present disclosure which is described in the following claims.

A seat automatic arrangement method of an autonomous driving vehicle, which arranges positions and postures of seats comprising first row seats and second row seats through remote control, the seat automatic arrangement method comprising:

a signal generation step of generating a signal corresponding to a seat-facing mode of seats when an operation device is operated;

a moving step of changing positions and postures of a console, first row seats, and second row seats to safety regions wherein interference does not occur when the signal corresponding to the seat-facing mode is generated;

a rotating step of rotating the first row seats such that the first row seats face the second row seats after the moving step; and a returning step of returning the positions and postures of the console, the first row seats, and the second row seats to reference positions or positions designated by a user after the rotating step, wherein changing the seats of the vehicle into the seat-facing mode is finished after the returning step is finished.

What is claimed is:

1. A seat automatic arrangement method of an autonomous driving vehicle, which arranges positions and/or postures of seats comprising first row seats and second row seats through remote control, the method comprising:
 a) generating a signal corresponding to a seat-facing mode of seats when an operation device is operated;
 b) changing positions and/or postures of at least one of a console, first row seats, and second row seats wherein interference does not occur when the signal corresponding to the seat-facing mode is generated;

c) rotating the first row seats such that the first row seats face the second row seats after step b); and d) returning the positions and/or postures of the console, the first row seats, and the second row seats to reference positions or positions designated by a user after step c), wherein changing the seats of the vehicle into the seat-facing mode is finished after completion of step d), wherein the console comprises a front console and a rear console that are separated from each other, and wherein in step b) the first row seats and the second row seats are moved rearward, the front console is moved forward, and the rear console is moved rearward, respectively, to a position where interference with the first row seats does not occur when the first row seats are rotated in step c).

2. The seat automatic arrangement method of claim 1, wherein when the console or a seat is inhibited due to interference with surrounding parts while steps b), c) and/or d) are performed, an error signal is transmitted to the operation device so that a passenger can visually and/or aurally recognize the error signal.

3. The seat automatic arrangement method of claim 2, wherein a position and a posture of a stuck console or seat are returned to a previous step.

4. The seat automatic arrangement method of claim 1, wherein when the vehicle is turned off after the seats finish being changed to the seat-facing mode, the console and the seats are automatically changed to a standard mode.

5. The seat automatic arrangement method of claim 4, wherein the standard mode of the seats is a mode of a state in which the first row seats comprising a driver seat and a passenger seat, and the second row seats positioned behind the first row seats all face a front, and the seat-facing mode is a mode in which the first row seats and the second row seats face each other.

6. The seat automatic arrangement method of claim 1, wherein an operation when the seats are changed to the seat-facing mode comprises an operation of moving forward and rearward the seats, an operation of rotating the seats, and an operation of reclining the seats.

7. The seat automatic arrangement method of claim 1, wherein the first row seats comprise a driver seat and a passenger seat; and any one of the driver seat and the passenger seat is rotated first and then the other one is rotated when the seat rotating first is rotated over 50%, when the first row seats are rotated in the rotating step.

* * * * *